United States Patent [19]

Bayard

[11] Patent Number: 4,962,071

[45] Date of Patent: Oct. 9, 1990

[54] METHOD OF FABRICATING A SINTERED BODY OF INDIUM TIN OXIDE

[75] Inventor: Michel L. Bayard, Portland, Oreg.

[73] Assignee: Tektronix, Inc., Beaverton, Oreg.

[21] Appl. No.: 346,429

[22] Filed: May 1, 1989

[51] Int. Cl.$^5$ ............................................. C04B 35/50
[52] U.S. Cl. .................................... 501/134; 501/126;
106/287.19; 106/286.4
[58] Field of Search ..................... 501/1, 94, 126, 134;
106/287.19, 287.18, 286.4

[56] References Cited

U.S. PATENT DOCUMENTS 4,456,549 6/1984 Kano et al. ......................... 252/518
4,619,704 10/1986 Hashimoto et al. ............. 106/286.4

*Primary Examiner*—William R. Dixon, Jr.
*Assistant Examiner*—Chris Gallo
*Attorney, Agent, or Firm*—John D. Winkelman; John Smith-Hill

[57] ABSTRACT

A sintered body of indium tin oxide is fabricated by forming a finely divided mixture of indium oxide, tin oxide, aluminum oxide and silicon dioxide, compacting the mixture, and heating the mixture to a sintering temperature.

15 Claims, No Drawings

4,962,071

METHOD OF FABRICATING A SINTERED BODY OF INDIUM TIN OXIDE

BACKGROUND OF THE INVENTION

This invention relates to a method of fabricating a sintered body of indium tin oxide.

A film of indium tin oxide is conductive and transparent and therefore such films find wide application where these properties are required, for example as electrodes in liquid crystal displays. Films of indium tin oxide are conventionally deposited by sputtering.

There are at present two principal methods for sputtering a film of indium tin oxide on a substrate. The first method involves sputtering separate targets of indium and tin in an atmosphere of oxygen at low pressure. This method is subject to disadvantage in that it is very difficult to control the proportions of indium and tin in the deposited film. Moreover, since the oxygen pressure must be kept low in order to maintain a reasonable rate of sputtering, the film that is deposited is not in fact indium tin oxide but rather a sub-oxide, which must be converted to indium tin oxide by carrying out a post-bake at a temperature of over 400° C. This limits application of this process to deposit of films on substrates that can withstand the postbaking operation.

The second known method of depositing an indium tin oxide film involves sputtering a ceramic target of indium tin oxide, which may be formed by sintering a mixture of $SnO_2$ and $In_2O_3$. This method provides better control over the composition of the deposited film, and the deposited film is generally conductive, although not as conductive as the ceramic target. The conductivity of the film can be improved by postbaking.

In order to avoid large, sharp spatial variations in the thickness of the film it is necessary that the ceramic target be of uniform density, so that it does not have regions of low density. It is desirable that the sputtering target be of high density in order for it to be cohesive and have a reasonable operational life.

A ceramic body of indium tin oxide having a density up to about 84% theoretical density can be made by hot isostatic pressing. However, it has been found that hot isostatic pressing sometimes leads to a target of non uniform composition even though the ingredients have been thoroughly mixed before the pressing takes place.

When granular material is sintered, material diffuses across the grain boundaries with the result that contacting grains are drawn together and merge. A consequence of the sintering operation is shrinkage, so that a sintered body is more dense than the unsintered material was.

It is known to use a sintering agent to promote the sintering operation. A sintering agent is liquid at the sintering temperature. The liquid sintering agent enters the space between grains and promotes diffusion across the grain boundaries. When the grains merge and are bonded together, the sintering agent is displaced.

SUMMARY OF THE INVENTION

In accordance with the present invention, a sintered body of indium tin oxide is fabricated by forming a finely divided mixture of indium oxide, tin oxide, an oxide of a trivalent material other than indium and an oxide of a tetravalent material other than tin, the oxide of said trivalent material and the oxide of said tetravalent material forming, on heating, a compound that acts as a sintering agent with respect to indium tin oxide, compacting the mixture, and heating the mixture to a sintering temperature.

In accordance with a second aspect of the present invention, a sintered body of indium tin oxide is fabricated by forming a finely divided mixture of indium oxide, tin oxide, aluminum oxide and silicon dioxide, compacting the mixture, and heating the mixture to a sintering temperature.

In accordance with a third aspect of the invention, an intermediate product for fabrication of a sintered body of indium tin oxide comprises a finely divided mixture of indium oxide, tin oxide, an oxide of a trivalent material other than indium and an oxide of a tetravalent material other than tin, the oxide of said trivalent material and the oxide of said tetravalent material forming, on heating, a compound that acts as a sintering agent with respect to indium tin oxide.

In accordance with a fourth aspect of the invention, a sintered body of indium tin oxide is fabricated by a method that comprises forming a finely divided mixture of indium oxide, tin oxide, an oxide of a trivalent material other than indium and an oxide of a tetravalent material other than tin, the oxide of said trivalent material and the oxide of said tetravalent material forming, on heating, a compound that acts as a sintering agent with respect to indium tin oxide, compacting the mixture, and heating the mixture to a sintering temperature.

Generally, an organic binding agent is added to the finely divided mixture before it is compacted so that the compacted mixture will have sufficient mechanical strength to permit it to be handled.

DETAILED DESCRIPTION

A mixture comprising about 95 parts by weight $In_2O_3$, 5 parts by weight $SnO_2$, 0.5–1 parts by weight $Al_2O_3$ and 0.5–1 parts by weight $SiO_2$ is thoroughly mixed together by ball milling. Thus, the mass of $SiO_2$ is 0.5–1 weight percent of the combined mass of $In_2O_3$ and $SnO_2$ and the mass of $Al_2O_3$ is 0.5–1 weight percent of the combined mass of $In_2O_3$ and $SnO_2$. The particle size of each component of the mixture is in the range 1–20 $\mu$m. An organic binder is added to the mixture, and the mixture is spread out in a flat sheet about 50 cm by 10 cm and about 1 cm thick. The sheet is compacted by application of force along the axis perpendicular to the general plane of the sheet. This may be done using a uniaxial press. However, it is preferred that compacting be accomplished by use of an isostatic press at a pressure of about 103 $MNm^{-2}$ (15,000 $lb/in^2$) and containing a mold such that the sheet is subject to uniaxial pressure.

Alumina sand is placed on a support plate of fired alumina, and a shrink plate of green alumina is placed on top of the alumina sand. Zirconia sand is placed on the shrink plate, and the compacted sheet is placed on the zirconia sand. The alumina support plate with the shrink plate and the compacted sheet on top is placed in an oven. The compacted sheet is heated in the oven in an atmosphere of air to a temperature of about 1600° C. at 100° per hour During the heating, the organic binder is burned off. The temperature is maintained at 1600° C. for one hour, and the oven is then allowed to cool In this fashion, the compacted sheet is sintered and yields an indium tin oxide body of uniform composition. During the sintering operation, the linear dimensions of the sheet shrink by about 25 percent The density of the sintered body exceeds 90% theoretical density. The resistivity of the sintered body is about the same as that of the ceramic indium tin oxide target made by hot isostatic pressing The sintered body is machined to the desired geometry In particular, the surface from which indium tin oxide will be sputtered is smoothed in order to avoid creation of hot spots during the sputtering operation.

During the sintering operation, the indium oxide and the tin oxide combine to form indium tin oxide. The aluminum oxide and the silicon dioxide combine to form aluminum silicate, of which the melting point is just below 1600° C. The liquid aluminum silicate acts as a sintering agent and promotes diffusion of indium tin oxide between the grains. The presence of the aluminum silicate in the sintered body does not degrade its qualities as a sputtering target.

The mechanism by which the aluminum silicate acts as a sintering agent with respect to indium tin oxide is not fully understood. However, since aluminum is trivalent and silicon is tetravalent, it is believed that there is an exchange of aluminum atoms with indium atoms and of silicon atoms with tin atoms, and that these exchanges promote diffusion of indium tin oxide across the grain boundaries. As the diffusion proceeds and the grains merge and are bonded together, the liquid aluminum silicate is displaced.

Although the melting point of silicon dioxide is about 1100° C., silicon dioxide does not serve as a sintering agent with respect to indium tin oxide. The melting point of alumina is about 2000° C., and therefore alumina cannot serve as a sintering agent with respect to indium tin oxide.

It will be appreciated that the present invention is not restricted to the particular method that has been described, and that variations may be made therein without departing from the scope of the invention as defined in the appended claims and equivalents thereof. For example, use of a binding agent is not essential, since the compacted body may be fired without removing it from its compaction mold, provided that the mold is made of a material that is able to withstand the firing temperature and is inert with respect to the ingredients of the compacted mixture. Also, the invention is not restricted to the various components of the compacted mixture being present in the proportions mentioned above. Since the aluminum silicate is not consumed during the sintering operation (except possibly for a minor amount that is trapped in the indium tin oxide structure), the proportions of $Al_2O_3$ and $SiO_2$ may be substantially less than stated and may each be as small as 0.01% of the mass of $In_2O_3$ and $SnO_2$. The proportions of $Al_2O_3$ and $SiO_2$ may each be as high as 10% of the mass of $In_2O_3$ and $SnO_2$.

I claim:

1. A method of fabricating a sintered body of indium tin oxide, comprising:
   (a) forming a finely divided mixture of $In_2O_3$, $SnO_2$, an effective amount of an oxide of a trivalent material other than indium and an effective amount of an oxide of a tetravalent material other than tin, the oxide of said trivalent material and the oxide of said tetravalent material forming, on heating, a compound that acts as a sintering agent with respect to indium tin oxide,
   (b) compacting the mixture, and
   (c) heating the mixture to a sintering temperature.

2. A method of fabricating a sintered body of indium tin oxide, comprising:
   (a) forming a finely divided mixture of $In_2O_3$, $SnO_2$, $Al_2O_3$ and $SiO_2$,
   (b) compacting the mixture, and
   (c) heating the compacted mixture to a sintering temperature.

3. A method of fabricating a sintered body of indium tin oxide, comprising:
   (a) forming a finely divided mixture of $IN_2O_3$, $SnO_2$, $Al_2O_3$ and $SiO_2$, the mass of $Al_2O_3$ in the mixture being 0.1-10% of the mass of $In_2O_3$ and $SnO_2$ in the mixture and the mass of $SiO_2$ in the mixture being 0.01-10% of the mass of $In_2O_3$ and $SnO_2$ in the mixture,
   (b) compacting the mixture, and
   (c) heating the compacted mixture to a sintering temperature.

4. A method according to claim 3, wherein the mixture formed in step (a) comprises about 95 parts by weight $In_2O_3$, 5 parts by weight $SnO_2$, 0.5-1 parts by weight $Al_2O_3$ and 0.5-1 parts by weight $SiO_2$.

5. A method according to claim 2, wherein step (b) comprises uniaxially compacting the mixture under a pressure of about 103 $MNm^{-2}$.

6. A method according to claim 2, wherein step (c) comprises heating the mixture at a rate of about 100° C. per hour, and the method also comprises maintaining the mixture at the sintering temperature for about one hour.

7. An intermediate product for fabrication of a sintered body of indium tin oxide, comprising a finely divided mixture of indium oxide, tin oxide, an oxide of a trivalent material other than indium and an oxide of a tetravalent material other than tin, the oxide of said trivalent material and the oxide of said tetravelent material forming, on heating, a compound that acts as a sintering a agent with respect to indium tin oxide.

8. A composition according to claim 7, wherein the trivalent material is aluminum and the tetravalent material is silicon.

9. A composition according to claim 1, comprising about 95 parts by weight $In_2O_3$, 5 parts by weight $SnO_2$, 0.5-1 parts by weight $Al_2O_3$ and 0.5-1 parts by weight $SiO_2$.

10. A sintered body of indium tin oxide fabricated by a method that comprises forming a finely divided mixture of $In_2O_3$, $SnO_2$, an oxide of a trivalent material other than indium and an oxide of a tetravelent material other than tin, the oxide of said trivalent material and the oxide of said tetravelent material forming, on heating, a compound that acts as a sintering agent with respect to indium tin oxide, compacting the mixture, and heating the mixture to a sintered temperature.

11. A method according to claim 1, wherein the mixture formed in step (a) comprises about 100 parts by weight $In_2O_3$ and $SnO_2$, at least about 0.01 parts by weight $Al_2O_3$ and at least about 0.01 parts by weight $SiO_2$.

12. A method according to claim 1, wherein the mass of the oxide of said trivalent material in the mixture formed in step (a) is at least about 0.5 percent of the mass of $In_2O_3$ and $SnO_2$ in the mixture and the mass of the oxide of said tetravelent material in the mixture formed in step (a) is at least about 0.5 percent of the mass of $In_2O_3$ and $SnO_2$ in the mixture.

13. A composition according to claim 7, wherein the mass of the oxide of said trivalent material is at least about 0.5 percent of the m ass of $In_2O_3$ and $SnO_2$ and the mass of the oxide of said tetravalent material is at least about 0.5 percent of the mass of $In_2O_3$ and $SnO_2$.

14. A composition according to claim 7, comprising about 100 parts by weight $In_2O_3$ and $SnO_2$, at least about 0.01 parts by weight $Al_2O_3$ and at least about 0.01 parts by weight $SiO_2$.

15. An intermediate product for fabrication of a sintered body of indium tin oxide, comprising a finely divided mixture of indium oxide, tin oxide, aluminum oxide and silicon dioxide, wherein $Al_2O_3$ and $SiO_2$ are each present in an amount equal to about 0.1–10 weight percent of the amount of $In_2O_3$ and $SnO_2$.

* * * * *

UNITED STATES PATENT AND TRADEMARK OFFICE
CERTIFICATE OF CORRECTION

PATENT NO. : 4,962,071

DATED : October 9, 1990

INVENTOR(S) : Michel L. Bayard

It is certified that error appears in the above-identified patent and that said Letters Patent is hereby corrected as shown below:

Col. 4, line 10, "0.1-10%" should read "0.01-10%".

Col. 4, line 53, "sintered" should read "sintering".

Signed and Sealed this

Fourth Day of February, 1992

Attest:

HARRY F. MANBECK, JR.

Attesting Officer     Commissioner of Patents and Trademarks